UNITED STATES PATENT OFFICE.

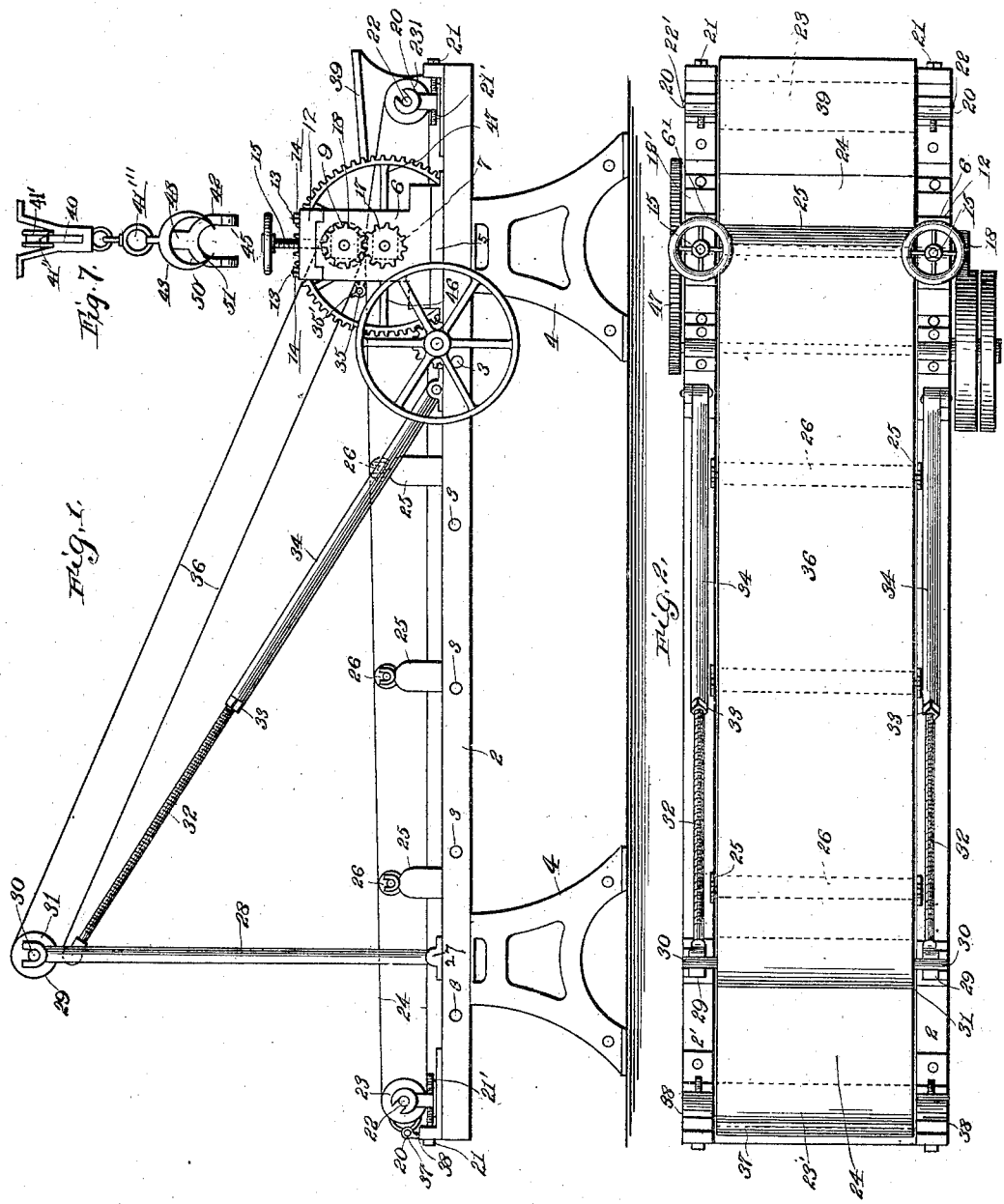

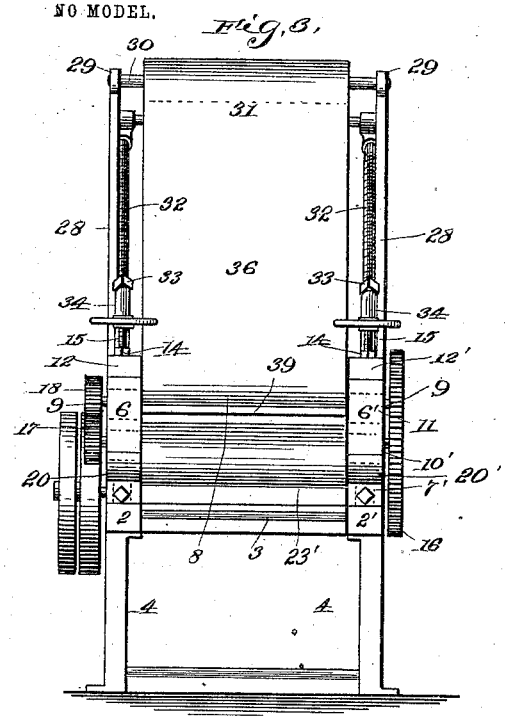

PHILIP H. ERTHEILER, OF PHILADELPHIA, PENNSYLVANIA.

MACHINE FOR PREPARING LEAF-TOBACCO FOR MANUFACTURE INTO CIGARS, &c.

SPECIFICATION forming part of Letters Patent No. 725,058, dated April 14, 1903.

Application filed February 1, 1902. Serial No. 92,169. (No model.)

*To all whom it may concern:*

Be it known that I, PHILIP H. ERTHEILER, a citizen of the United States, residing at Philadelphia, Pennsylvania, have invented a new and useful Machine for Preparing Leaf-Tobacco for Manufacture into Cigars and other Tobacco Products.

The object of my invention is to reduce the thickness of the stems and veins of leaf-tobacco to the thickness of the web without disintegrating the leaf, and thus to render the entire material of the leaf availably valuable for manufacture.

My invention to this end consists of a pair of rolls and a supporting-frame and housings, a pair of endless aprons arranged to carry leaves into and through the rolls, rollers and bearings sustaining and guiding said aprons, and doctors for removing the tobacco when adhering to the aprons, and means for removing and replacing the rolls and aprons, as hereinafter described.

The following is a full, clear, and exact description of my improved machine, reference being had to the accompanying drawings, in which—

Figure 1 shows a side elevation of my machine; Fig. 2, a plan; Fig. 3, a front elevation; Fig. 4, a rear elevation. Fig. 5 shows in front view the grapnel for hoisting the lower roll in and out of position in the housings. Fig. 6 shows an end or side view thereof. Fig. 7 shows the hoisting device for removing and replacing the rolls, drawn in proper relation to these parts as shown in Fig. 1. Fig. 8 shows in front view the grapnel for hoisting the upper roll in and out of the housings, and Fig. 9 shows the same in side or end view.

Referring to the drawings, 1 represents the frame of the machine, consisting of two parallel sills 2 and 2', held together by transverse bracing-bolts 3 and supported by leg-frames 4. On the sills 2 and 2' is firmly fixed a bed-plate 5, having securely attached to it housings 6 and 6'. In the housings 6 and 6' are fitted bearings 7 and 7', in which turn the journals 10 and 10' of a lower roll 8. A second pair of bearings 9 and 9' are fitted in the housings 6 and 6' above the bearings 7 and 7', in which are fitted the journals 11 and 11' of an upper roll 19. The housings 6 and 6' are closed at the top by removable caps 12 and 12', held down by bolts 13 and nuts 14, through which caps 12 and 12' screws 15 and 15' are fitted, which press the bearings 9 and 9' downwardly toward the lower roll. A gear-wheel 16, secured on the arbor of the lower roll, turns it, and a pinion 17 on the opposite end of the arbor of the lower roll communicates rotary motion through a like pinion 18 on the arbor of the upper roll 19. The rolls 8 and 19 are preferably made of chilled cast-iron and should be of such diameters as not to spring apart in the center when being used. Upon the ends of the sills 2 and 2' are secured bearings 20 and 20' with cleft or open tops, so as to permit of the lifting out of the rollers, and are adjustable in the direction of the length of the sills by means of screws 21 and 21', in which bearings 20 and 20' are fitted the journals 22 and 22' of rollers 23 and 23'. The rollers 23 and 23' are lower than the top of the lower roll 8. An endless apron 24, of non-corrodible sheet metal, is passed around the rollers 23 and 23' and above and below the roller 8. Bearings 25 and 25', having open clefts, are fixed upon the sills 2 and 2' and support rollers 26, which sustain the upper side of the apron 24 and are easily removed and replaced.

Near the rear end of the sills 2 and 2' are fixed hinged bearings 27, supporting a frame 28, having open cleft bearings 29 at the upper ends, in which turn the journals 30 of a roller 31. The frame 28 is raised toward a vertical position by screws 32, pivotally attached thereto, and nuts 33, telescoping in tubular sleeves 34, pivotally attached to the sills 2 and 2'. An endless apron 36 passes around the roller 31 and roll 19 and is tightened by screwing the nuts 33 downwardly on the screws 32 against the ends of the tubular sleeves 34. A doctor 35, pivotally supported in bearings 35', attached to the housings 6 and 6', presses against the apron 36 on a line where it is in close contact with the roll 19 and serves to remove any particles of tobacco-leaf that may adhere to the apron 36. A doctor 37, pivotally supported in bearings 38, attached to the bearings 20 and 20', presses against the apron 24 where it is supported on the roller 23 and serves to remove any particles of tobacco-leaf that may adhere to the apron 24.

A table or feed-board 39 is supported at the sills 2 and 2' over the roller 23' and is inclined downwardly toward the apron 24, from which table the moistened leaves of tobacco are laid upon the apron 24 with the stems in parallel position with the axis of the roll 8.

The rolls 8 and 19 require to be removed and replaced to introduce the metallic endless aprons 24 and 36, which aprons, while sufficiently flexible to apply closely to the cylindric faces of the rolls 8 and 19, must not be creased or buckled, and to accomplish these operations a rail 40 is placed above the housings 6 and 6' in parallel position with the axis of the roll 19. A trolley-wheel 41' is fitted to travel on the rail 40, with a strap from which tackle-blocks of a chain-hoist 41 are suspended, as shown in Fig. 7, (the handchain of the hoist being omitted in the drawings.) From the lower end of the chain-hoist a grapnel 42 is suspended. The grapnel 42 is provided with hooks, as shown in Figs. 5 and 6, which engage the two opposite spokes 46 and 47 of the gear-wheel 16 on the roll 8, and a heel 48 rests against the upper side of the rim of the gear-wheel 16. A bar 49 extends from the hooked portion of the grapnel parallel with the axis of the roll 8 and is provided with a clevis 49', adjustably clamped thereon, so that when the grapnel 42 and roll 8 are supported from the tackle 41 the roll will be in horizontal position. The grapnel 43 is suspended by a trolley 41'' and chain-hoist 41''' from the rail 40 and is formed with a cylindric head 50, fitted to embrace the pinion 18, with an opening 51 at the lower sill to clear the teeth of the pinion 18, in engagement with the pinion 17, and has a bar 52, parallel with the axis of the roll 19, and a clevis 53, adjustably clamped on the bar 52, arranged so that when suspended by the tackle the roll 19 will be in horizontal position. By removing the caps 12 and 12' and applying the grapnels 43 and 42 to the rolls 19 and 8 the rolls are raised above the housings 6 and 6', are withdrawn sidewise, and the aprons placed in position, and the rolls returned in the loops of the aprons and lowered into position in the housings and the rollers 31, 23, and 23' placed in position in the bearings 20 and 20', and the frame 28 is adjusted by the screws 32, and the rollers 23 and 23' are adjusted by the screws 21, and the aprons are tightened into contact with the rolls 8 and 19.

The operation of the machine is as follows: The operator places the leaves of tobacco, previously moistened, on the feeding-board 39 and opens them out, laying them on the apron 24 with the stems in parallel position with the axes of the rolls 8 and 19, whence they are carried between the rolls and the stems flattened and expanded laterally without breaking them away from the web of the leaf and rendering the stems of equal thickness and combustibility with the web portions of the leaf and of equal value to the other portion. After passing the rolls the aprons traveling apart expose the leaves thus pressed and flattened to inspection, and they are removed for use, and any scraps or fragments of leaves adhering to the aprons are removed by the doctors, so that the aprons are returned clean to the front of the machine, and the leaves of tobacco may be fed as rapidly as they can be handled and opened. Thus an economy in labor as well as saving of material is achieved by the use of this machine.

Having described my invention, what I claim is—

1. In a machine for preparing leaf-tobacco for manufacture, a pair of rolls and means of forcing said rolls toward each other, a pair of non-corrodible metallic aprons and guiding and supporting rollers arranged to lead said aprons to diverge and expose the tobacco to inspection and removal substantially as set forth.

2. In a machine for preparing tobacco-leaves for manufacture, a pair of rolls, a pair of endless aprons arranged to convey leaves between the said aprons to be compressed between the rolls, and rolls arranged to support and propel and to open said aprons and expose the leaves to inspection and removal, in combination with doctors arranged to detach particles of tobacco from adhesion to said aprons, as and for the purpose set forth.

3. In a machine for preparing tobacco-leaves for manufacture, a pair of rotating rolls, a pair of endless metallic aprons passing around and between said rolls, adjustable bearings and rollers arranged to tighten the lower apron, an adjustable roller and bearings supporting said roller, arranged to guide and tighten the upper apron in an upwardly-inclined direction, in combination with supporting-rollers under the lower apron arranged to operate, as set forth.

4. In a machine of the class specified, a pair of endless metallic aprons, a pair of rolls, housings and bearings supporting said rolls and removable caps in said housings, in combination with grapnels constructed and arranged as described, and a rail-track and suspended trolley and tackles arranged to retract said rolls and replace the same within the loops of said aprons, substantially as set forth.

PHILIP H. ERTHEILER.

Witnesses:
WM. R. LESTER,
WM. KNIGHT SHRYOCK.